United States Patent
Kim et al.

(10) Patent No.: US 9,088,057 B2
(45) Date of Patent: Jul. 21, 2015

(54) BATTERY CHARGING SYSTEM AND METHOD OF THEREOF

(75) Inventors: Jaerok Kim, Yongin-si (KR); Joosik Jung, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 409 days.

(21) Appl. No.: 13/568,197

(22) Filed: Aug. 7, 2012

(65) Prior Publication Data

US 2013/0241490 A1     Sep. 19, 2013

(30) Foreign Application Priority Data

Mar. 14, 2012     (KR) ................ 10-2012-0026246

(51) Int. Cl.

| | |
|---|---|
| *H02J 7/00* | (2006.01) |
| *H01M 10/6556* | (2014.01) |
| *H01M 10/44* | (2006.01) |
| *B60L 11/18* | (2006.01) |

(52) U.S. Cl.
CPC ....... *H01M 10/5057* (2013.01); *B60L 11/1874* (2013.01); *B60L 11/1875* (2013.01); *H01M 10/443* (2013.01); *H01M 10/6556* (2015.04); *H02J 7/0091* (2013.01); *B60L 2240/545* (2013.01); *H02J 7/0006* (2013.01); *Y02T 10/7005* (2013.01); *Y02T 10/705* (2013.01)

(58) Field of Classification Search
CPC ............. Y02T 10/7005; Y02T 10/705; Y02T 10/7044; Y02T 90/16; Y02T 10/7283; H02J 7/34

USPC .......... 320/107, 112, 150, 114, 116, 113, 147
See application file for complete search history.

(56) References Cited

U.S. PATENT DOCUMENTS

| | | | |
|---|---|---|---|
| 6,914,414 B2* | 7/2005 | Hamada et al. ............... 320/107 |
| 7,764,496 B2* | 7/2010 | Nguyen et al. ................ 361/697 |
| 7,859,220 B2* | 12/2010 | Bushong et al. .............. 320/107 |
| 2004/0174138 A1* | 9/2004 | Moores et al. ................ 320/114 |
| 2005/0088140 A1* | 4/2005 | Bushong et al. .............. 320/107 |
| 2005/0269995 A1* | 12/2005 | Donnelly et al. ............. 320/150 |
| 2006/0110656 A1* | 5/2006 | Moores et al. .................. 429/83 |
| 2006/0181247 A1* | 8/2006 | Marukawa et al. ........... 320/150 |
| 2007/0122692 A1* | 5/2007 | Smith et al. ..................... 429/87 |
| 2007/0128505 A9* | 6/2007 | Yahnker et al. ................. 429/62 |
| 2011/0091759 A1 | 4/2011 | Song |
| 2011/0189522 A1 | 8/2011 | Kim |
| 2012/0171532 A1 | 7/2012 | Lee et al. |
| 2013/0207617 A1* | 8/2013 | Houchin-Miller et al. ... 320/150 |

FOREIGN PATENT DOCUMENTS

| | | |
|---|---|---|
| KR | 1998-034148 | 8/1998 |
| KR | 10-2007-0052375 A | 5/2007 |
| KR | 10-2011-0019490 A | 2/2011 |

(Continued)

*Primary Examiner* — Brian Ngo (74) *Attorney, Agent, or Firm* — Lee & Morse, P.C.

(57) ABSTRACT

A battery charging system includes a battery pack having a plurality of battery cells and a pack terminal, a passage that accommodates a circulation therethrough of a temperature conditioning fluid for the battery pack, the passage includes an inflow part through which the temperature conditioning fluid is introduced and an outflow part through which the temperature conditioning fluid is discharged, an inner control unit that measures a state of the battery pack to supply an inner fluid to the passage, and an outer charging unit that charges the battery pack and that supplies an outer fluid to the passage.

18 Claims, 5 Drawing Sheets

(56) References Cited

FOREIGN PATENT DOCUMENTS

| KR | 10-2011-0041873 A | 4/2011 |
| KR | 10-2011-0080537 A | 7/2011 |
| KR | 10-2011-0089661 A | 8/2011 |
| KR | 10-2011-0090491 A | 8/2011 |

* cited by examiner

BATTERY CHARGING SYSTEM AND METHOD OF THEREOF

BACKGROUND

Electric vehicles and hybrid vehicles, which are operated by electric energy, are being developed to, e.g., reduce pollution. An electric vehicle may employ a battery pack as a main power source, and the battery pack may include a plurality of rechargeable battery cells therein. Further, the electric vehicles may make less noise, and do not generate exhaust gas. A hybrid vehicle may be a combination of an electric vehicle and an internal combustion engine vehicle, and may employ two or more power sources, e.g., a battery motor and an internal combustion engine.

SUMMARY

Embodiments may be realized by providing a battery charging system that includes a battery pack including a plurality of battery cells and a pack terminal, a passage that accommodates a circulation therethrough of a temperature conditioning fluid for the battery pack, the passage includes an inflow part through which the temperature conditioning fluid is introduced and an outflow part through which the temperature conditioning fluid is discharged, an inner control unit that measures a state of the battery pack to supply an inner fluid to the passage, and an outer charging unit that charges the battery pack and that supplies an outer fluid to the passage.

The inflow part may include an inner inflow port through which the inner fluid is introduced, an outer inflow port through which the outer fluid is introduced, and a first valve arranged at a branch point where the inner inflow port and the outer inflow port are separated. The first valve may be configured to control an opening and closing of the inner inflow port and the outer inflow port.

When the battery pack is in a charging state, the first valve may be configured to close the inner inflow port and open the outer inflow port. When the battery pack is in a driving state, e.g., discharging state, the first valve may be configured to open the inner inflow port and close the outer inflow port.

The outflow part may include an inner outflow port through which the inner fluid is discharged, an outer outflow port through which the outer fluid is discharged, and a second valve arranged at a branch point where the inner outflow port and the outer outflow port are separated. The second valve may be configured to control an opening and closing of the inner outflow port and the outer outflow port.

When the battery pack is in a charging state, the second valve may be configured to close the inner outflow port and open the outer outflow port. When the battery pack is in a driving state, e.g., a discharging state, the second valve may be configured to open the inner outflow port and close the outer outflow port.

The inner control unit may include a sensing part that is configured for at least one of sensing a temperature of the battery pack and checking whether the outer charging unit is connected to the battery pack, and a cooling part that cools the inner fluid. The outer charging unit may include a charging part connected to the battery pack to charge the battery pack, a charge sensing part that senses a temperature of the battery pack to obtain a sensed temperature, a charge cooling part that cools the outer fluid, and a charge heating part that heats the outer fluid.

When the battery pack is in a charging state, the charging part may include a charging terminal electrically connected to the pack terminal of the battery pack. When the sensed temperature of the battery pack is higher than a first reference temperature, the outer charging unit may be configured to operate the charge cooling part to cool the outer fluid. When the sensed temperature of the battery pack is lower than a second reference temperature, the outer charging unit may be configured to operate the charge heating part to heat the outer fluid. The first reference temperature may be higher than the second reference temperature.

The battery pack may be enclosed by the passage, the inflow part may be at one end of the passage, and the outflow part may be at another end of the passage. The inflow part may include an inner inflow port that supplies the inner fluid to the one end of the passage, an outer inflow port that supplies the outer fluid to the one end of the passage, and a first valve configured to control an opening and closing of the inner inflow port and the outer inflow port. The outflow part may include an inner outflow port that discharges the inner fluid from the other end of the passage, an outer outflow port that discharges the outer fluid from the other end of the passage, and a second valve configured to control an opening and closing of the inner outflow port and the outer outflow port.

Embodiments may also be realized by providing a charging method using a battery charging system that includes determining whether a charging part is connected to a battery pack, setting a path of a passage through which an outer fluid for conditioning temperature of the battery pack circulates when it is determined that the charging part is connected to the battery pack, measuring a temperature of the battery pack to obtain a measured temperature, comparing the measured temperature of the battery pack with at least one of a first reference temperature and a second reference temperature, and supplying the outer fluid to the passage.

The passage may include an inflow part including an inner inflow port and an outer inflow port, and an outflow part including an inner outflow port and an outer outflow port. Setting of the path may include the outer inflow port and the outer outflow port being opened, and the inner inflow port and the inner outflow port being closed. The first reference temperature may be higher than the second reference temperature in the comparing of the measured temperature. In the comparing of the measured temperature, when the temperature of the battery pack is higher than the first reference temperature, the outer fluid may be cooled and then supplied to the passage. In the comparing of the measured temperature, when the temperature of the battery pack is lower than the second reference temperature, the outer fluid may be heated and then supplied to the passage.

Setting the path of the passage may include adjusting first and second valves to connect to the passage an outer fluid storage part that houses the outer fluid. The first and second valves may be adjusted before measuring the temperature of the battery pack and before comparing the measured temperature with at least one of the first reference temperature and the second reference temperature. Supplying the outer fluid may occur after setting the path of the passage, after measuring the temperature of the battery pack, and after comparing the measured temperature with at least one of the first reference temperature and the second reference temperature.

BRIEF DESCRIPTION OF THE DRAWINGS

Features will become apparent to those of ordinary skill in the art by describing in detail exemplary embodiments with reference to the attached drawings in which.

DETAILED DESCRIPTION

Korean Patent Application No. 10-2012-0026246 filed on Mar. 14, 2012, in the Korean Intellectual Property Office, and entitled: "Battery Charging System and Method of Thereof" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element is referred to as being "on" another element, it can be directly on the other element, or intervening elements may also be present. Further, it will also be understood that when an element is referred to as being "between" two elements, it can be the only element between the two elements, or one or more intervening elements may also be present. Like reference numerals refer to like elements throughout.

Figure 1:
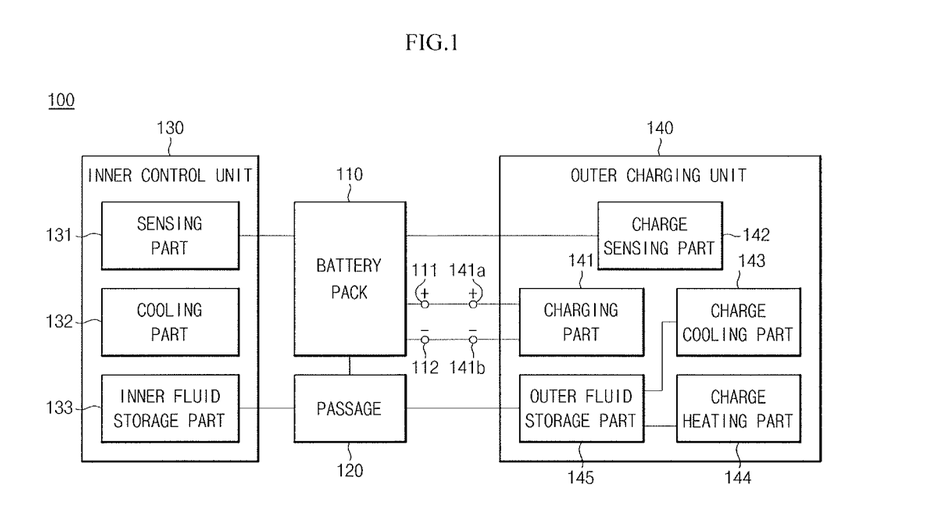
FIG. 1 illustrates a block diagram of a battery charging system according to an exemplary embodiment.
Figure 2:
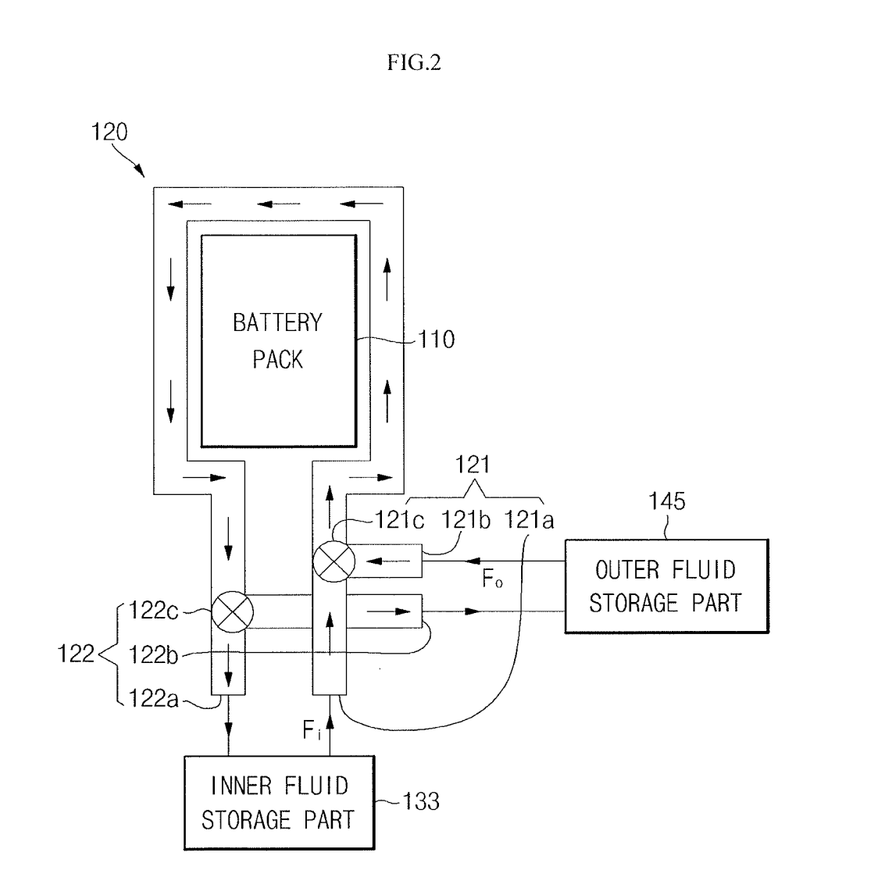
FIG. 2 illustrates a schematic view of a passage in FIG. 1, according to an exemplary embodiment.
Figure 3A:
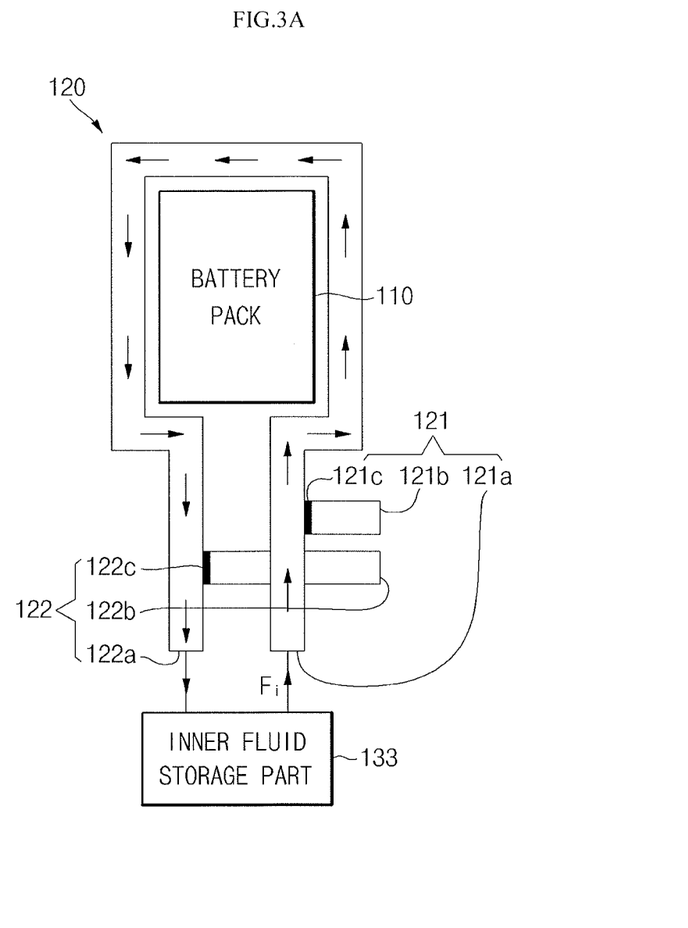
FIG. 3A illustrates a schematic view of a path of a passage when a battery pack is being driven, according to an exemplary embodiment.
Figure 3B:
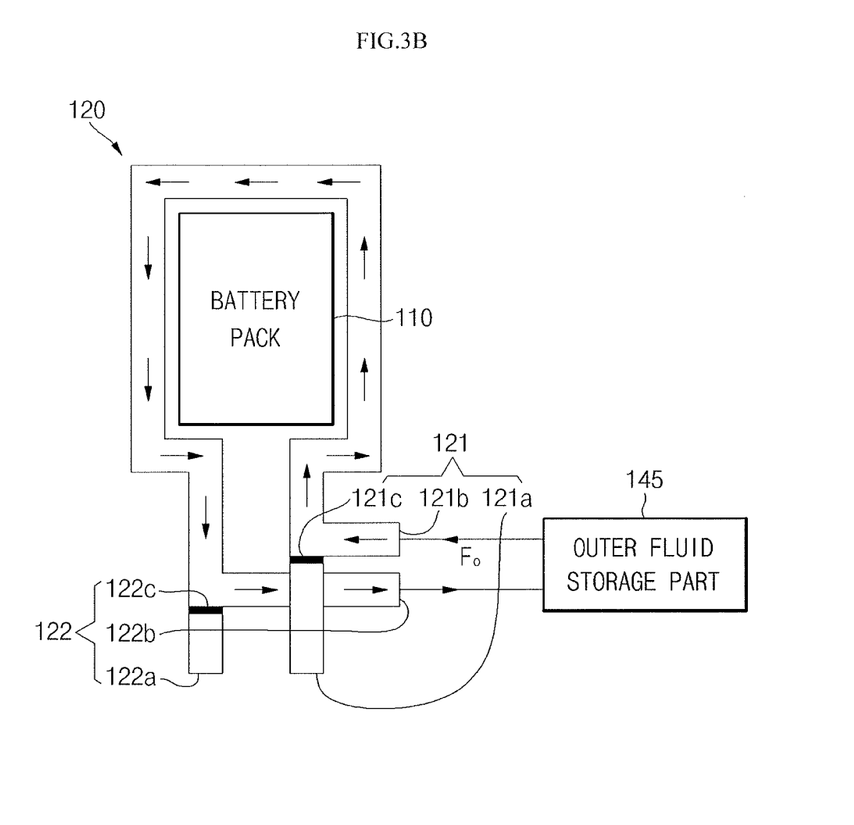
FIG. 3B illustrates a schematic view of a path of a passage when a battery pack is being charged, according to an exemplary embodiment.

FIG. 1 is a block diagram illustrating a battery charging system according to an exemplary embodiment. FIG. 2 is a schematic view illustrating a passage of FIG. 1. FIG. 3A is a schematic view illustrating a path of a passage when a battery pack is being driven, according to an exemplary embodiment. FIG. 3B is a schematic view illustrating a path of a passage when a battery pack is being charged, according to an exemplary embodiment.

Referring to FIGS. 1 and 2, a battery charging system 100 may include a battery pack 110, a passage 120, an inner control unit 130, and an outer charging unit 140. The passage 120 may provide a connection between the battery pack 110 and the inner control unit 130 and between the battery pack 110 and the outer charging unit 140. The battery pack 110, the passage 120, and the inner control unit 130 may be disposed within a device that is operated by the battery pack 110. The outer charging unit 140 may be disposed outside the device to charge the battery pack 110, e.g., the outer charging unit 140 may be connected and disconnected from the device that is operated by the battery pack 110 based on a user's desire for charging conditions. According to an exemplary embodiment, when the battery pack 110 is disposed within an electric vehicle, the passage 120 and the inner control unit 130 may also be disposed within the electric vehicle, and the outer charging unit 140 may be provided as a charging station for charging electric vehicles.

The battery pack 110 may include a plurality of rechargeable battery cells that are connected to each other in series and/or in parallel. Each of the battery cells may be any one selected from, e.g., a nickel hydrogen cell, a lead cell, a lithium secondary cell, and an equivalent thereof, but is not limited thereto. Each of the battery cells may be any one selected from, e.g., a cylindrical cell, a prismatic cell, a pouch type cell, and an equivalent thereof, but is not limited thereto. Ones of the plurality of the battery cells connected to each other may constitute the single battery pack 110. The single battery pack 110 may be configured for used as a power source of an electric vehicle and/or a hybrid vehicle.

Pack terminals 111 and 112 may be provided to the battery pack 110, e.g., as illustrated in FIG. 1. For example, a charging part 141 of the outer charging unit 140 may be connected to the pack terminals 111 and 112 to charge the battery pack 110. For example, through the pack terminals 111 and 112, the outer charging unit 140 may be electrically connected and/or directly coupled to the battery pack 110.

The passage 120 may be configured to accommodate at least one of a plurality of temperature condition fluids flowing therethrough. For example, fluids $F_i$ and $F_o$ may pass through the passage 120 to cool or heat the battery pack 110, e.g., as illustrated in FIG. 2. The fluid $F_i$ may be an inner fluid supplied from the inner control unit 130 and the fluid $F_o$ may be an outer fluid supplied from the outer charging unit 140. The passage 120 may surround the battery pack 110, or pass between the battery cells, but the form of the passage 120 is not limited thereto. The exemplary embodiment of the passage 120 surrounding the battery pack 110 is illustrated in FIG. 2.

The passage 120 may include an inflow part 121 through which the fluids $F_i$ and $F_o$ are introduced. The passage 120 may include an outflow part 122 through which the fluids $F_i$ and $F_o$, after having circulating through the passage 120, are discharged. The fluids $F_i$ and $F_o$ may be configured to flow through the passage 120 at different times.

The inflow part 121 includes an inner inflow port 121a through which the fluid $F_i$ (also referred to as the inner fluid) is introduced, an outer inflow port 121b through which the fluid $F_o$ (also referred to as the outer fluid) is introduced, and a first valve 121c for controlling the opening and closing of the inner inflow port 121a and/or the outer inflow port 121b. According to an exemplary embodiment, two inflow ports are provided in the inflow part 121 as the inner inflow port 121a and the outer inflow port 121b, and the first valve 121c opens/closes the inner inflow port 121a and/or the outer inflow port 121b.

The first valve 121c may be disposed at a branch point of the inflow part 121 where the inner inflow port 121a and the outer inflow port 121b are separated, e.g., have separate flow channels. The first valve 121c may be positioned so as to control the opening and closing of the inner inflow port 121a and the outer inflow port 121b. Referring to FIG. 3A, according to an exemplary embodiment, when the first valve 121c opens the inner inflow port 121a, the outer inflow port 121b is closed. In the reverse, referring to FIG. 3B, when the first valve 121c opens the outer inflow port 121b, the inner inflow port 121a is closed. That is, while the battery pack 110 is being driven, e.g., is in a driving state in which the battery pack 110 may be in the process of being discharged, the first valve 121c may open the inner inflow port 121a to introduce the inner fluid $F_i$, thereby cooling the battery pack 110. While the battery pack 110 is being charged, e.g., is in an active charging state, the first valve 121c may open the outer inflow port 121b to introduce the outer fluid $F_o$, thereby cooling the battery pack 110. The inner fluid $F_i$ may be a same or similar material as the outer fluid $F_o$. Alternately, the inner fluid $F_i$ and outer fluid $F_o$ may be different materials.

The outflow part 122 includes an inner outflow port 122a through which the inner fluid Fi is discharged, an outer outflow port 122b through which the outer fluid Fo is discharged; and a second valve 122c for controlling the opening and closing of the inner outflow port 122a and the outer outflow port 122b. Two outflow ports are provided as the inner outflow port 122a and the outer outflow port 122b, and the second valve 122c opens the inner outflow port 122a or the outer outflow port 122b. The second valve 122c is disposed at a branch point of the outflow part 122 where the inner outflow port 122a and the outer outflow port 122b are separated, so as to control the opening and closing thereof. Referring to FIG. 3A, when the second valve 122c opens the inner outflow port 122a, the outer outflow port 122b is closed. In the reverse, referring to FIG. 3B, when the second valve 122c opens the outer outflow port 122b, the inner outflow port 122a is closed. That is, while the battery pack 110 is being driven, the second valve 122c may open the inner outflow port 122a to discharge the inner fluid $F_i$ introduced through the inner inflow port 121a. While the battery pack 110 is being charged, e.g., in an active charging state, the second valve 122c may open the outer outflow port 122b to discharge the outer fluid $F_o$ introduced through the outer inflow port 121b.

The first and second valves 121c and 122c may simultaneously operate. For example, when the first valve 121c opens the inner inflow port 121a, the second valve 122c may also open the inner outflow port 122a. Therefore, the inner fluid $F_i$ supplied from the inner control unit 130 may circulate through the passage 120, and return to the inner control unit 130. When the first valve 121c opens the outer inflow port 121b, the second valve 122c may also open the outer outflow port 122b. Therefore, the outer fluid $F_o$ supplied from the outer charging unit 140 may circulate through the passage 120, and return to the outer charging unit 140.

The inner control unit 130 may sense a state of the battery pack 110 to control the first and second valves 121c and 122c. Based on the sensed stage, e.g., the inner control unit 130 may determine whether to supply or to interrupt/stop supplying of the inner fluid $F_i$ to the passage 120. The inner control unit 130 may include, e.g., a sensing part 131, a cooling part 132, and an inner fluid storage part 133. The sensing part 131, the cooling part 132, and the inner fluid storage part 133 may be housed, e.g., completely enclosed, within the inner control unit 130.

The sensing part 131 may sense states, e.g., different temperature states, a connection state, etc, of the battery pack 110. For example, the sensing part 131 may measure a temperature of the battery pack 110. The sensing part 131 may transmit a temperature value to another component of the inner control unit 130. The sensing part 131 may monitor the pack terminals 111 and 112 of the battery pack 110 to check whether outer charging terminals 141a and/or 141b are connected to the pack terminals 111 and 112, respectively. The sensing part 131 may transmit a checked result, e.g., based on the connection state of the outer charging terminals 141a and/or 141b, to the inner control unit 130.

According to an exemplary embodiment, when temperature of the battery pack 110 measured by the sensing part 131 is equal to or higher than a set temperature, the inner fluid $F_i$, e.g., that is stored in the inner fluid storage part 133, may be supplied to the battery pack 110. Before, the inner fluid $F_i$ is supplied to the battery pack, the cooling part 132 may cool the inner fluid $F_i$ stored in the inner fluid storage part 133 to supply the cooled inner fluid $F_i$ to the passage 120. The cooling part 132 may cool the inner fluid $F_i$ stored in the inner fluid storage part 133 after a temperature measured by the sensing part 131 is determined to be equal to or higher than a set temperature. At this point, the inner fluid $F_i$ may be supplied through the inner inflow port 121a of the passage 120.

The inner fluid storage part 133 stores the inner fluid $F_i$ and may be in fluid communication, e.g., direct fluid communication, with the inner inflow port 121a of the passage 120. The inner fluid storage part 133 may connect to the passage 120 to discharge the inner fluid $F_i$ thereto. The inner fluid $F_i$ may circulate through the passage 120 to cool the battery pack 110. At this point, the inner fluid Fi has been cooled by the cooling part 132, and thus, the inner fluid Fi circulating through the passage 120 may absorb heat from the battery pack 110 to emit the heat to an outside. The inner fluid $F_i$ may be introduced through the inner inflow port 121a from the inner fluid storage part 133, and may be discharged through the inner outflow port 122a back to the inner fluid storage part 133. The inner fluid Fi may include a material such as water, air, or oil, but embodiments are not limited thereto. For example, other types of cooling mediums may be used.

The inner control unit 130 may check a state of the battery pack 110 through the sensing part 131. According to an exemplary embodiment, in the case that the outer charging terminals 141a and 141b are not connected to the pack terminals 111 and 112 of the battery pack 110, the inner control unit 130 may order the first and second valves 121c and 122c to open the inner inflow port 121a and the inner outflow port 122a and close the outer inflow port 121b and the outer outflow port 122b. After that, the inner control unit 130 may receive temperature information of the battery pack 110 through the sensing part 131. At this point, if temperature of the battery pack 110 is equal to or higher that a set temperature, the inner control unit 130 operates the cooling part 132 to cool the inner fluid Fi stored in the inner fluid storage part 133. Then, the inner control unit 130 supplies the inner fluid Fi from the inner fluid storage part 133 to the passage 120 to cool the battery pack 110. If the outer charging terminals 141a and 141b are connected to the pack terminals 111 and 112 of the battery pack 110, the inner control unit 130 orders the first and second valves 121c and 122c to close the inner inflow port 121a and the inner outflow port 122a and open the outer inflow port 121b and the outer outflow port 122b.

The outer charging unit 140 may charge the battery pack 110, and may cool and/or heat the outer fluid $F_o$ according to a state of the battery pack 110 by supplying the outer fluid $F_o$ to the passage 120. As described above, the outer charging unit 140 may be installed in a charging station where the battery pack 110 is being charged. Thus, the outer charging unit 140 is a separate component outside an electric vehicle or hybrid vehicle provided with the battery pack 110. The outer charging unit 140 may include, e.g., the charging part 141, a charge sensing part 142, a charge cooling part 143, a charge heating part 144, and an outer fluid storage part 145. The charging part 141, a charge sensing part 142, a charge cooling part 143, a charge heating part 144, and an outer fluid storage part 145 may be housed, e.g., completely enclosed, within the outer charging unit 140.

The charging part 141 may charge the battery pack 110, and may include the outer charging terminals 141a and 141b. When the outer charging terminals 141a and 141b are connected to the pack terminals 111 and 112, respectively, of the battery pack 110, the charging part 141 may charge the battery pack 110. According to an exemplary embodiment, the outer charging terminal 141a (also referred to as a positive terminal) of the charging part 141 may be connected to the pack terminal 111 (also referred to as a positive terminal) of the battery pack 110, and the outer charging terminal 141b (also referred to as a negative terminal) of the charging part 141 may be connected to the pack terminal 112 (also referred to as a negative terminal) of the battery pack 110. When the outer charging terminals 141a and 141b are connected to the batter pack 110, the first valve 121c may open the outer inflow port 121b and the second valve 122c may open the outer outflow port 122b (the inner inflow port 121a and the inner outflow port 122a may be closed as this time). The opening and the closing of the first valve 121c and the second valve 122c may be controlled by the inner control unit 130.

The charge sensing part 142 may sense states, e.g., different temperature states, of the battery pack 110. For example, the charge sensing part 142 may measure a temperature of the battery pack 110 to transmit a temperature value to the outer charging unit 140. The temperature of the battery pack 110 measured by the charge sensing part 142 may be compared with a first reference temperature and a second reference temperature (different from the first reference temperature) by the outer charging unit 140. The first reference temperature may be higher than the second reference temperature.

According to an exemplary embodiment, when temperature of the battery pack 110 measured by the charge sensing part 142 is higher than the first reference temperature, the charge cooling part 143 may cool the outer fluid Fo stored in the outer fluid storage part 145 to supply cooled outer fluid Fo to the passage 120. At this point, the cooled outer fluid Fo may be supplied through the outer inflow port 121b of the passage 120. When the battery pack 110 is charged at room temperature, heat is generated, which may degrade charging efficiency of the battery pack 110. Thus, the charge cooling part 143 may cool the outer fluid $F_o$, so that the outer fluid $F_o$ may absorb heat from the battery pack 110 to emit the heat to the outside.

When temperature of the battery pack 110 measured by the charge sensing part 142 is lower than the second reference temperature, the charge heating part 144 may heat the outer fluid $F_o$ stored in the outer fluid storage part 145 to supply the heated outer fluid $F_o$ to the passage 120. At this point, the heated outer fluid Fo is supplied through the outer inflow port 121b of the passage 120. When temperature of the battery pack 110 is decreased below the second reference temperature by a cold environment, the charging efficiency of the battery pack 110 may be degraded. Thus, the charge heating part 144 may heat the outer fluid $F_o$, so that the outer fluid $F_o$ may increase the temperature of the battery pack 110.

The outer fluid storage part 145 may store the outer fluid $F_o$ and may be connected to both the charge cooling part 143 and the charge heating part 144. The outer fluid storage part 145 may be in fluid communication, e.g., direct fluid communication, with the passage 120 to discharge the outer fluid $F_o$ thereto. The outer fluid $F_o$ may circulate through the passage 120 to cool or heat the battery pack 110, e.g., based on the measured temperature. For example, the outer fluid $F_o$ may be cooled by the charge cooling part 143, and may circulate through the passage 120 to emit heat from the battery pack 110 to the outside. The outer fluid $F_o$ may be heated by the charge heating part 144, and may circulate through the passage 120 to increase the temperature of the battery pack 110. The outer fluid $F_o$ may be introduced through the outer inflow port 121b, and may be discharged through the outer outflow port 122b. The outer fluid $F_o$ may include a material such as water, air, or oil, but embodiments are not limited thereto.

According to an exemplary embodiment, when the outer charging terminals 141a and 141b are connected to the pack terminals 111 and 112 of the battery pack 110, the outer charging unit 140 may charge the battery pack 110 through the charging part 141. The outer charging unit 140 may measure a temperature of the battery pack 110 through the charge sensing part 142, and may compare the temperature of the battery pack 110 with the first and second reference temperatures. When the temperature of the battery pack 110 is higher than the first reference temperature, the outer charging unit 140 operates the charge cooling part 143 to cool the outer fluid $F_o$ stored in the outer fluid storage part 145. Then, the outer charging unit 140 supplies the cooled outer fluid $F_o$ to the passage 120 to cool the battery pack 110. When the temperature of the battery pack 110 is lower than the second reference temperature, the outer charging unit 140 operates the charge heating part 144 to heat the outer fluid $F_o$ stored in the outer fluid storage part 145. Then, the outer charging unit 140 supplies the heated outer fluid Fo to the passage 120 to heat the battery pack 110.

A battery pack may be quickly charged. Thus, the heat generated while a battery pack is being charged may be significantly greater than the heat generated while the battery pack is being driven. For example, a travel current applied when an electric vehicle is traveling is approximately ⅓ C, and a charge current applied when the electric vehicle is being charged is approximately 1 C. Thus, an electric vehicle is provided with a cooling system for emitting heat from a battery pack. Such a cooling/heating system has a large size and a complicated structure to satisfy both a traveling condition and a charging condition.

In contrast, according to exemplary embodiments, the passage 120 is provided with the outer inflow port 121b and the outer outflow port 122b. Thus, while the battery pack 110 is being charged, the outer fluid Fo may be introduced to cool or heat the battery pack 110. Accordingly, the battery charging system 100 makes it possible to decrease the capacity of a cooling system disposed in an electric vehicle. As described above, the battery charging system 100 may include the outer inflow port 121b and the outer outflow port 122b at the passage 120, thereby saving costs.

Hereinafter, a charging method using the battery charging system 100 will now be described.

Figure 4:
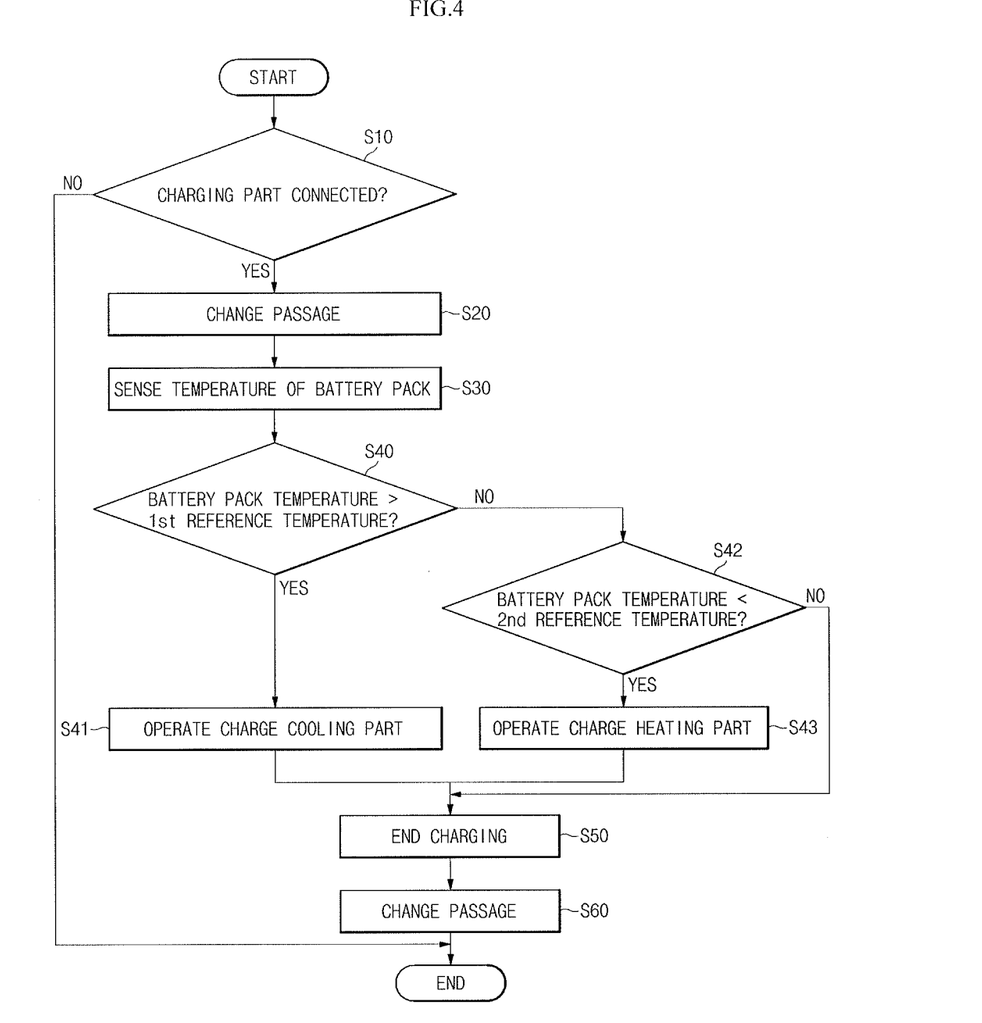
FIG. 4 illustrates a flowchart of a charging method using a battery charging system, according to an exemplary embodiment.

FIG. 4 is a flowchart illustrating a charging method using a battery charging system according to an exemplary embodiment. A charging method using a battery charging system according to the current exemplary embodiment will now be described with reference to FIGS. 1 to 4.

In operation S10, the inner control unit 130 may check a state of the battery pack 110 through the sensing part 131. That is, the sensing part 131 may check whether the outer charging terminals 141a and 141b of the charging part 141 are connected to the pack terminals 111 and 112 of the battery pack 110, and transmits a checked result to the inner control unit 130. If the checked result determines that the charging part 141 is connected to the battery pack 110, the inner control unit 130, in operation S20, orders the first and second valves 121c and 122c to close the inner inflow port 121a and the inner outflow port 122a and open the outer inflow port 121b and the outer outflow port 122b, respectively. At this point, since the outer charging terminals 141a and 141b of the charging part 141 are connected to the pack terminals 111 and 112 of the battery pack 110, the battery pack 110 is being charged (e.g., is in an active charging state). In operation S30, the charge sensing part 142 senses a temperature of the battery pack 110 to transmit a temperature value. In operation S40, the outer charging unit 140 compares the temperature of the battery pack 110 with the first reference temperature.

For example, when the temperature of the battery pack 110 is higher than the first reference temperature, the outer charging unit 140, in operation S41, operates the charge cooling part 143 to cool the outer fluid $F_o$ stored in the outer fluid storage part 145 and supply the cooled outer fluid $F_o$ to the passage 120. The cooled outer fluid $F_o$ may be introduced through the outer inflow port 121b, may circulate through the passage 120 to cool the battery pack 110, and then the outer fluid $F_o$ may be discharged through the outer outflow port 122b. Referring to FIG. 4, the cooled outer fluid $F_o$ may circulate through the passage 120 to cool the battery pack 110 until the battery pack 110 is fully charged.

During the circulation of the cooled outer fluid $F_o$ in the passage 120, the temperature of the battery pack 110 may be sensed a plurality of times. For example, the temperature may be sensed a plurality of times during the charging operation to determine whether the supply of the cooled outer fluid $F_o$ should be interrupted.

In operation S42, if the temperature sensed by the charge sensing part 142 is not higher than the first reference temperature, the temperature is compared to the second reference temperature (the second reference temperature is lower than the first reference temperature). If the temperature of the battery pack 110 is lower than the second reference temperature, the outer charging unit 140, in operation S43, operates the charge heating part 144 to heat the outer fluid $F_o$ stored in the outer fluid storage part 145 and supply the heated outer fluid $F_o$ to the passage 120. The heated outer fluid $F_o$ may be introduced through the outer inflow port 121b, may circulate through the passage 120 to heat the battery pack 110, and then the outer fluid $F_o$ may be discharged through the outer outflow port 122b. Referring to FIG. 2, the outer fluid $F_o$ may circulate through the passage 120 to heat the battery pack 110 until the battery pack 110 is fully charged.

During the circulation of the heated outer fluid $F_o$ in the passage 120, the temperature of the battery pack 110 may be sensed a plurality of times. For example, the temperature may be sensed a plurality of times during the charging operation to determine whether the supply of the heated outer fluid $F_o$ should be interrupted.

When the battery pack 110 is fully charged, the connection between the charging part 141 and the battery pack 110 may be removed from the battery pack 110 in operation S50. When the sensing part 131 senses that the charging part 141 has been removed from connection with the battery pack 110, the inner control unit 130, in operation S60, orders the first and second valves 121c and 122c to close the outer inflow port 121b and the outer outflow port 122b and open the inner inflow port 121a and the inner outflow port 122a. Accordingly, the inner control unit 130 may be prepared for a driving state of the battery pack 110.

By way of summation and review, battery packs used as main power sources of electric vehicles and hybrid vehicles may be quickly charged, and may slowly consume the energy stored therein while the vehicle is traveling. Thus, the heat generated from a battery pack while the vehicle is being charged may be significantly greater than the heat generated from the battery pack while the vehicle is traveling. Such heat from both the charging of the battery pack and the traveling of the vehicle may degrade performance of the battery pack. Thus, a cooling system may be provided to an electric vehicle to emit heat from a battery pack. However, since the amount of heat generated from a battery pack under a charging condition is different from that under a traveling condition, a large and complicated cooling system may be required to satisfy both the charging and traveling conditions.

In contrast, embodiments relate to a battery charging system and method of thereof that, e.g., provides a passage including an outer inflow port and an outer outflow port to circulate an outer fluid from an outer charging unit, and saves costs. The charging system may save costs. According to embodiments, the battery charging system may include an outer inflow port and an outer outflow port at a passage to introduce and discharge an outer fluid from an outer charging unit so that the capacity of an inner cooling system may be decreased. A cost savings may be realized according to the embodiments. Further, since the outer charging unit includes a cooling part for cooling the outer fluid to remove heat from a battery pack during a charging process, increased charging efficiency may be realized. Also, since the outer charging unit includes a heating part for heating the outer fluid to increase the temperature of the battery pack during a low temperature charging process, increased charging efficiency may be realized.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A battery charging system, comprising:
   a battery pack including a plurality of battery cells and a pack terminal;
   a passage that accommodates a circulation therethrough of a temperature conditioning fluid for the battery pack, the passage including an inflow through which the temperature conditioning fluid is introduced, and an outflow through which the temperature conditioning fluid is discharged;
   an inner controller to measure a temperature state of the battery pack to supply an inner fluid to the passage and to compare the measured temperature state of the battery pack with at least one of a first reference temperature or a second reference temperature; and
   terminals coupled to an outer charger to charge the battery pack, the passage coupled to a source to receive an outer fluid, wherein the inflow includes:
   an inner inflow port through which the inner fluid is introduced,
   an outer inflow port through which the outer fluid is introduced,
   a first valve at a branch point where the inner inflow port and the outer inflow port are separated, the first valve to control opening and closing of the inner inflow a second valve arranged at a branch point where the inner outflow port and the outer outflow port are separated, the second valve being to control an opening and closing of the inner outflow port and the outer outflow port; and
   wherein the inner controller is to adjust first and second valves to connect to the passage to an outer fluid storage that houses the outer fluid and to adjust first and second valves to connect to the passage an inner fluid storage that houses the inner fluid, the first and second valves to be adjusted before the temperature of the battery pack is measured and before the measured temperature with at least one of the first reference temperature or the second reference temperature is compared.

2. The battery charging system as claimed in claim 1, wherein, when the battery pack is in a charging state, the first valve is to close the inner inflow a second valve arranged at a branch point where the inner outflow port and the outer outflow port are separated, the second valve being to control an opening and closing of the inner outflow port and the outer outflow port; and
   wherein the inner controller is to adjust first and second valves to connect to the passage to an outer fluid storage that houses the outer fluid and to adjust first and second valves to connect to the passage an inner fluid storage that houses the inner fluid, the first and second valves to be adjusted before the temperature of the battery pack is measured and before the measured temperature with at least one of the first reference temperature or the second reference temperature is compared.

3. The battery charging system as claimed in claim 1, wherein, when the battery pack is in a driving state, the first valve is to open the inner inflow port and close the outer inflow port.

4. The battery charging system as claimed in claim 1, wherein the outflow includes:
- an inner outflow port through which the inner fluid is discharged,
- an outer outflow port through which the outer fluid is discharged.

5. The battery charging system as claimed in claim 4, wherein when the battery pack is in a charging state, the second valve is to close the inner outflow port and open the outer outflow port.

6. The battery charging system as claimed in claim 4, wherein when the battery pack is in a driving state, the second valve is to open the inner outflow port and close the outer outflow port.

7. The battery charging system as claimed in claim 1, wherein the inner controller includes:
- a sensor to perform at least one of sensing a temperature of the battery pack or checking whether the outer charger is connected to the battery pack, and
- a cooler to cool the inner fluid.

8. The battery charging system as claimed in claim 1, wherein the system includes the outer charger and the outer charger includes:
- a charging circuit connected to the battery pack to charge the battery pack,
- a charge sensor to sense a temperature of the battery pack to obtain a sensed temperature,
- a cooler to cool the outer fluid, and
- a heater to heat the outer fluid.

9. The battery charging system as claimed in claim 8, wherein, when the battery pack is in a charging state, the charging circuit is electrically connected to the terminals for charging the battery pack.

10. The battery charging system as claimed in claim 8, wherein:
- when the sensed temperature of the battery pack is higher than the first reference temperature, the outer charger is to operate the cooler to cool the outer fluid, and
- when the sensed temperature of the battery pack is lower than the second reference temperature, the outer charger is to operate the heater to heat the outer fluid.

11. The battery charging system as claimed in claim 10, wherein the first reference temperature is higher than the second reference temperature.

12. The battery charging system as claimed in claim 1, wherein:
- the battery pack is enclosed by the passage,
- the inflow is at one end of the passage and the outflow is at another end of the passage,
- the inflow includes the inner inflow port that supplies the inner fluid to the one end of the passage, the outer inflow port that supplies the outer fluid to the one end of the passage, and the first valve to control an opening and closing of the inner inflow port and the outer inflow port, and
- the outflow includes the inner outflow port that discharges the inner fluid from the other end of the passage, the outer outflow port that discharges the outer fluid from the other end of the passage, and the second valve to control an opening and closing of the inner outflow port and the outer outflow port.

13. The battery charging system as claimed in claim 1, wherein the external source of the outer fluid is in or coupled to the charger.

14. A charging method using a battery charging system, the charging method comprising:
- determining whether a charger is connected to a battery pack;
- setting a path of a passage through which an outer fluid that conditions a temperature of the battery pack circulates, when the charger is connected to the battery pack;
- measuring a temperature of the battery pack to obtain a measured temperature;
- comparing, by a battery charging system, the measured temperature of the battery pack with at least one of a first reference temperature or a second reference temperature;
- supplying the outer fluid to the passage based on the comparison, wherein the passage includes an inflow including an inner inflow port and an outer inflow port, and an outflow including an inner outflow port and an outer outflow port, and wherein setting of the path includes the outer inflow port and the outer outflow port being opened, and the inner inflow port and the inner outflow port being closed;
- wherein setting the path of the passage includes adjusting first and second valves to connect to the passage an outer fluid storage that houses the outer fluid and adjusting first and second valves to connect to the passage an inner fluid storage that houses the inner fluid, the first and second valves to be adjusted before measuring the temperature of the battery pack and before comparing the measured temperature with at least one of the first reference temperature or the second reference temperature.

15. The charging method as claimed in claim 14, wherein the first reference temperature is higher than the second reference temperature in the comparing of the measured temperature.

16. The charging method as claimed in claim 14, wherein when the temperature of the battery pack is higher than the first reference temperature, the method includes:
- cooling the outer fluid is cooled, and
- supplying the cooled outer fluid to the passage.

17. The charging method as claimed in claim 14, when the temperature of the battery pack is lower than the second reference temperature, the method includes:
- heating the outer fluid, and
- supplying the heated outer fluid to the passage.

18. The charging method as claimed in claim 14, wherein supplying the outer fluid occurs after setting the path of the passage, after measuring the temperature of the battery pack, and after comparing the measured temperature with at least one of the first reference temperature or the second reference temperature.

* * * * *